US012036652B2

(12) United States Patent
Kim

(10) Patent No.: US 12,036,652 B2
(45) Date of Patent: Jul. 16, 2024

(54) STAPLER FOR BOX EDGES TO PRESS END OF IRON CORE BY DOUBLE PULLING OF HANDLE BAR

(71) Applicant: Young Jin Kim, Daegu (KR)

(72) Inventor: Young Jin Kim, Daegu (KR)

( * ) Notice: Subject to any disclaimer, the term of this patent is extended or adjusted under 35 U.S.C. 154(b) by 0 days.

(21) Appl. No.: 17/793,002

(22) PCT Filed: Aug. 20, 2021

(86) PCT No.: PCT/KR2021/011099
§ 371 (c)(1),
(2) Date: Jul. 14, 2022

(87) PCT Pub. No.: WO2023/022265
PCT Pub. Date: Feb. 23, 2023

(65) Prior Publication Data
US 2024/0173836 A1 May 30, 2024

(51) Int. Cl.
*B25C 5/00* (2006.01)
*B25C 5/02* (2006.01)
*B25C 5/11* (2006.01)

(52) U.S. Cl.
CPC .............. *B25C 5/0285* (2013.01); *B25C 5/11* (2013.01)

(58) Field of Classification Search
CPC ........... B25C 5/02; B25C 5/0285; B25C 5/11; B25C 5/16; B25C 5/161; B25C 5/1606; B25C 5/00
USPC .......................................................... 227/124
See application file for complete search history.

(56) References Cited

U.S. PATENT DOCUMENTS 4,199,095 A * 4/1980 Yamanoi ................... B27F 7/19 227/129
4,380,312 A * 4/1983 Landrus .................... B25C 5/06 227/139
4,795,073 A 1/1989 Yamamoto et al.
5,346,114 A * 9/1994 Udagawa .............. B25C 5/1627 227/129
5,427,296 A * 6/1995 Chen ..................... B25C 5/1696 227/7
6,450,389 B1 * 9/2002 Clouse .................... B27F 7/025 227/140
7,562,801 B2 * 7/2009 Pelletier .................... B25C 5/06 227/119

(Continued)

FOREIGN PATENT DOCUMENTS

EP 0 543 617 B1 9/1995
JP S62-39981 U 3/1987

(Continued)

OTHER PUBLICATIONS

International Search Report issued on May 11, 2022, for corresponding International Patent Application No. PCT/KR2021/011099, 3 pages.

*Primary Examiner* — Gloria R Weeks
(74) *Attorney, Agent, or Firm* — Hauptman Ham, LLP

(57) ABSTRACT

The present invention relates to a stapler for box edges which fixes edge portions of a box, presses an end of an iron core, and doubly pulls a handle bar so as to minimize protrusion of the end of the iron core. The stapler includes a load bar and a push plate which can locate an iron core on an iron core support plate when the handle bar is pulled first and presses the end portions of the iron core inward when the handle bar is pulled second.

5 Claims, 8 Drawing Sheets

(56) References Cited

U.S. PATENT DOCUMENTS

| | | | | | |
|---|---|---|---|---|---|
| 8,511,530 | B2 * | 8/2013 | Yonekawa | B27F 7/19 | 227/114 |
| 11,504,120 | B2 * | 11/2022 | Beardsley | A61B 17/0644 | |
| 2010/0096430 | A1 * | 4/2010 | Sugihara | B27F 7/19 | 227/155 |
| 2013/0240594 | A1 * | 9/2013 | Scabin | B25C 5/0207 | 227/108 |
| 2019/0337134 | A1 * | 11/2019 | Wang | B25C 5/1606 | |
| 2023/0364765 | A1 * | 11/2023 | Wilson | B25C 5/0292 | |

FOREIGN PATENT DOCUMENTS

| | | | |
|---|---|---|---|
| JP | 2001-354219 | A | 12/2001 |
| KR | 10-2010-0072120 | A | 6/2010 |
| KR | 10-1043056 | B1 | 6/2011 |
| KR | 10-1508527 | B1 | 4/2015 |
| KR | 10-2011344 | B1 | 8/2019 |

* cited by examiner

STAPLER FOR BOX EDGES TO PRESS END OF IRON CORE BY DOUBLE PULLING OF HANDLE BAR

CROSS-REFERENCE TO RELATED APPLICATION

The present application is a national stage filing under 35 U.S.C § 371 of PCT application number PCT/KR2021/011099 filed on Aug. 20, 2021. The aforementioned application is incorporated herein by reference in its entirety.

TECHNICAL FIELD

The present invention relates to a stapler for box edges. More specifically, the present invention relates to a stapler for box edges, which can fix edge portions of a box, press an end of an iron core, and doubly pull a handle bar so as to minimize protrusion of the end of the iron core.

BACKGROUND ART

First, a conventional art will be described.

In general, a stapler refers to a mechanism for stapling several sheets of paper into one bundle by using a Π-shaped iron needle.

Such a conventional stapler includes: a lower plate having a support plate to make a steel needle of the stapler bent at an end of one side of an upper portion; an iron needle receiving part of which an end portion is coupled to the other side of the lower plate, at which the support plate is formed, by a hinge to be rotated, and having an insertion space into which a plurality of iron needles are inserted in a horizontal direction; and an upper plate of which one side is connected to the hinge and which is configured to surround the iron needle receiving part so as to let the iron needle out of the stapler when the one side is selectively pressed. Therefore, the conventional stapler can fix and staple several sheets of paper.

However, in general, the conventional stapler just serves to staple several pieces of paper. Besides several pieces of paper, a prefabricated box can be easily fastened and stapled at an overlapped portion by the stapler. Edge portions of the box may be coupled and fixed by bolts and nuts made of a synthetic resin material. In order to fix the edge portions of the box, end portions come in contact with each other, protruding portions of the ends are overlapped with each other, and then, bolts and nuts are fastened in holes formed in the overlapped portion.

Meanwhile, such a conventional fabricated box is very inconvenient in assembling the box, and has several disadvantages in that it is economically inefficient since the bolts and the nuts are not sold additionally and the entire fabricated box must be abandoned if any one among the bolts and the nuts is damaged, and in that a user cannot use the fabricated box if any one among the bolts and the nuts is omitted or defective when the user bought the fabricated box online or offline.

So, a separate edge reinforcing member is provided to the prefabricated box in order to reinforce the edge, but it is impossible to apply the edge reinforcing member to all kinds of prefabricated boxes.

Accordingly, Korean Patent No. 10-1508527 discloses a ‘stapler’, and Korean Patent Laid Open No. 10-2010-0072120 discloses a ‘stapler having vertical and edge fixing frames’. However, the above-mentioned disadvantages still remain.

In addition, Korean Patent No. 10-2011344 which has been granted to the inventor of the present invention discloses a ‘stapler for box edges and method for fixing box edges by using stapler’. However, in the case that an iron core is inserted into the box, contents are caught with the iron core due to the protrusion of the end of the iron core folded in the inward direction when the contents are put in the box. Therefore, the box cannot smoothly provide its function and deteriorates an aesthetic sense.

DISCLOSURE

Technical Problem

The present disclosure has been made to solve the above-mentioned problems occurring in the prior art, and it is an object to provide a stapler for box edges to press an end of an iron core by double pulling of a handle bar, which includes a load bar and a push plate to locate an iron core on an iron core support plate by first pulling and to press end portions of the iron core in the inward direction by second pulling when a user pulls the handle bar, thereby pressing the end portions of the iron core by double pulling of the handle bar.

Technical Solution

To accomplish the above objects, there is provided a stapler for box edges to press an end portion of an iron core by double pulling of a handle bar, which includes: a lower plate having an iron core support plate formed at an end of one side of an upper portion thereof to make an iron core of the stapler bent, the iron core support plate gradually getting wider downward from the top and having inclined surfaces respectively formed at both sides of the upper portion and fitting portions extending downward from ends of the inclined surfaces; an iron core storage part of which an end portion is coupled with one side of the lower plate by a hinge, into which a plurality of iron cores are inserted in a horizontal direction, and which has an iron core outlet selectively discharging the iron core inserted into the iron core storage part, an iron core pushing member pushing the iron cores, a fixing rod which is formed on the opposite side of the iron core pushing member, and a first pushing elastic member of which one side is connected to the iron core pushing member and the other side is connected to the fixing rod; an upper plate of which one side is connected with the hinge, and which is disposed above the iron core storage part and has a second pushing elastic member disposed therein to be connected with one side of the iron core storage part; insertion spaces which are respectively formed between the iron core support plate and the iron core storage part in different directions so that sides of a fabricated box can be put therein; and an operating means, of which one side of an upper portion is located inside the lower plate and the upper plate and the other side is located below the lower plate, and which has a handle bar, a fixing member, a moving pin, and a pulling elastic member so that a user can operate the stapler by pulling the handle bar, the stapler further including: a first load bar formed on the lower plate and having a pushing groove formed at a predetermined angle, a sliding groove formed to be slidable in the back-and-forth direction, and a fixing groove to which a fixing pin is coupled; a second load bar connected with the fixing pin of the first load bar; a third load bar of which one side is connected with the second load bar by a fixing pin and the other side is connected to the lower plate; a rack disposed inside the iron core support plate and vertically sliding through a sliding pin connected to the sliding groove of the first load bar; rotary gears respectively disposed at both sides and engaging and rotating with the rack sliding vertically; and pressing plates respectively disposed at both sides of the outer face of the iron core support plate and connected with the rotary gears by fixing pins.

Advantageous Effects

According to the present invention, since the first, second and third load bars sliding on the front surface of the stapler, the rack sliding upward by the sliding of the first load bar, and the rotary gears rotating in engagement with the saw-teeth formed on the outer circumference by the sliding of the rack are rotated, the pressing plates disposed at portions spaced apart from the rotary gears at a predetermined interval press the end portions of the iron core, thereby minimizing protrusion of the end portions of the iron core when the iron core is stuck on a box, preventing contents in the box from being caught to the end portions of the iron core, and maximizing an aesthetic sense.

Figure 1:
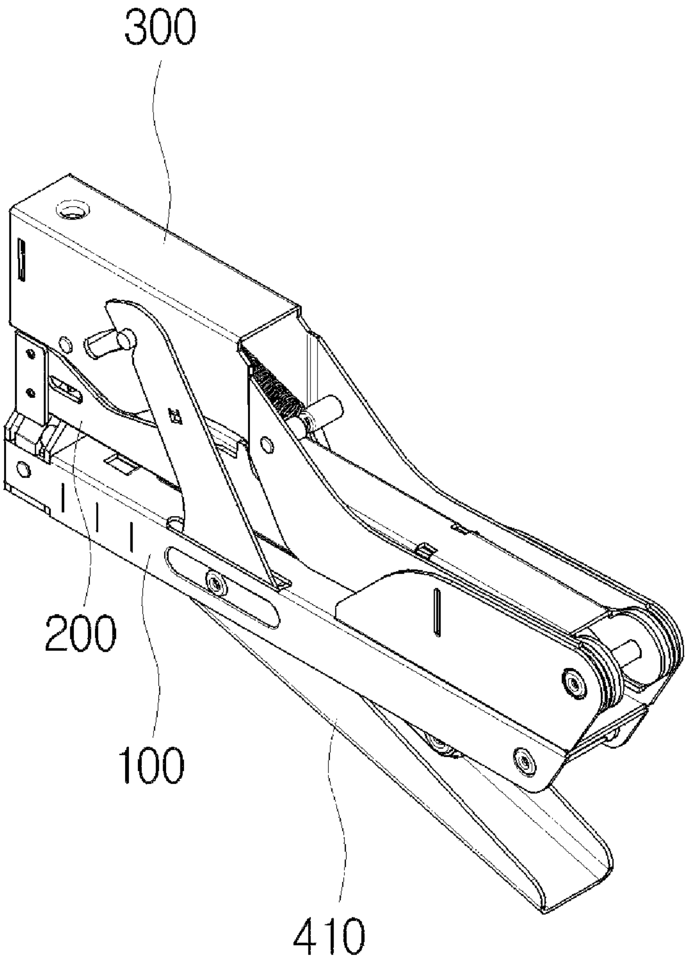
FIG. 1 is a perspective view illustrating a preferred embodiment of the present invention.

100: Lower plate 110: Iron core support plate
200: Iron core storage part
201: Iron core 201*a*: Iron core end portion
300: upper plate 350: Guide path
410: Handle bar 430: Moving pin
1100: First load bar
1101: Pushing groove 1103: Sliding groove
1105: Fixing groove 1200: Second load bar
1300: Third load bar 1400: Pulling member
2100: Rack 2200: Rotary gear 2300: Pressing plate
2400: Front support plate 2410: Through hole
2500: Rear support plate 2510: Through hole

MODE FOR INVENTION

Figure 2:
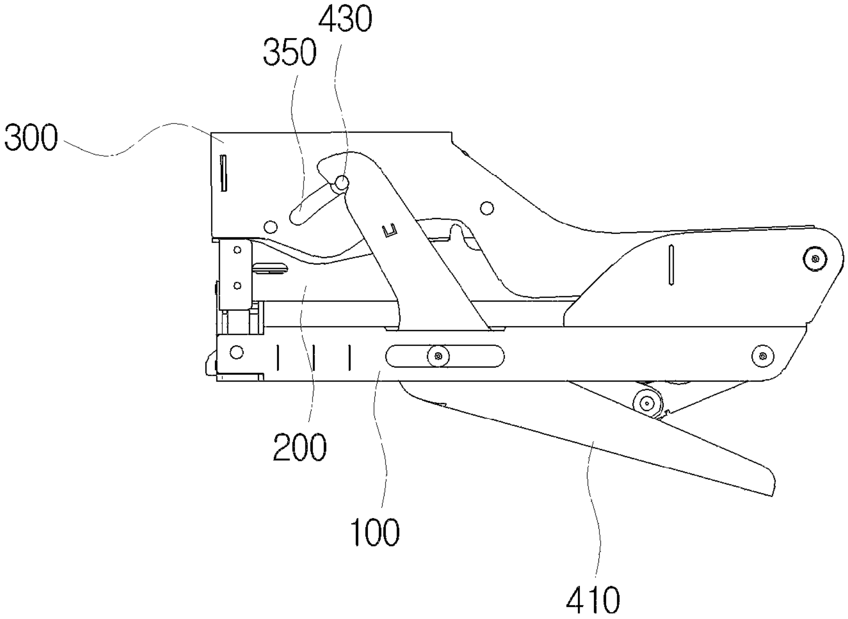
FIG. 2 is a front view illustrating the preferred embodiment of the present invention.
Figure 3:
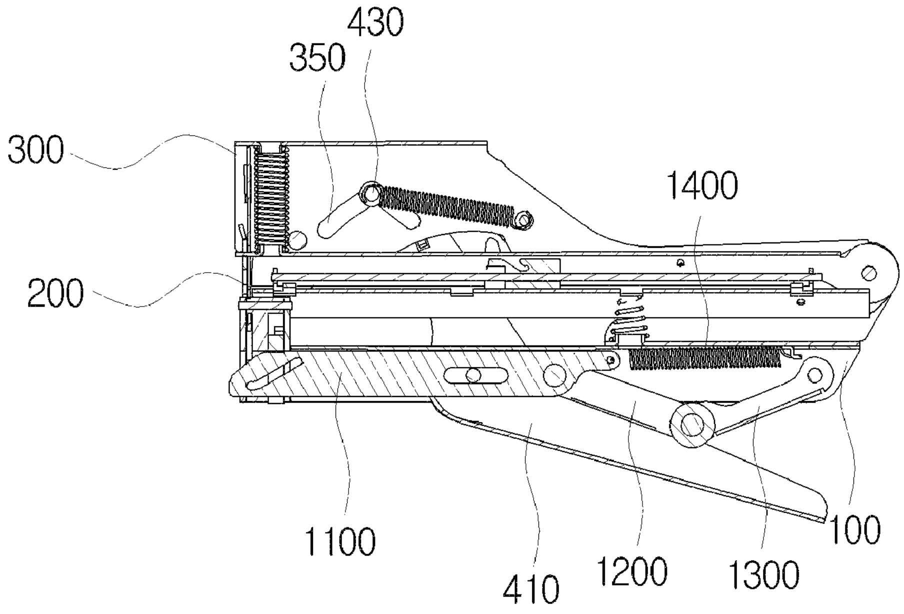
FIG. 3 is a cross-sectional view illustrating the preferred embodiment of the present invention.
Figure 4:
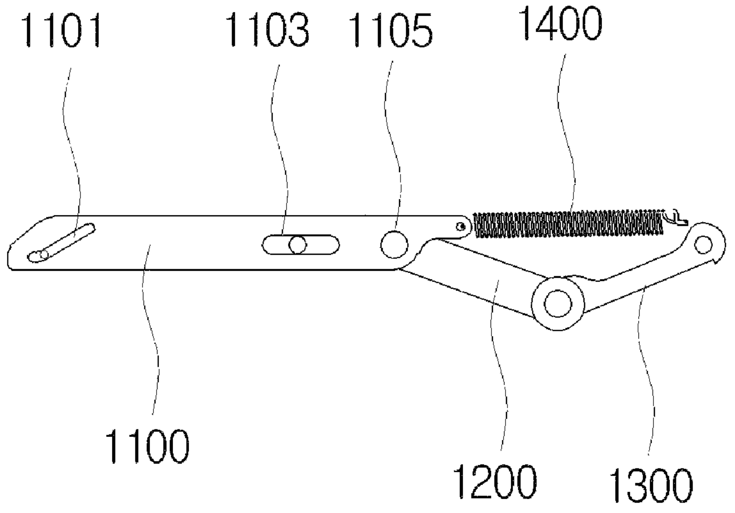
FIG. 4 is a front view illustrating a load bar of the present invention.
Figure 5:
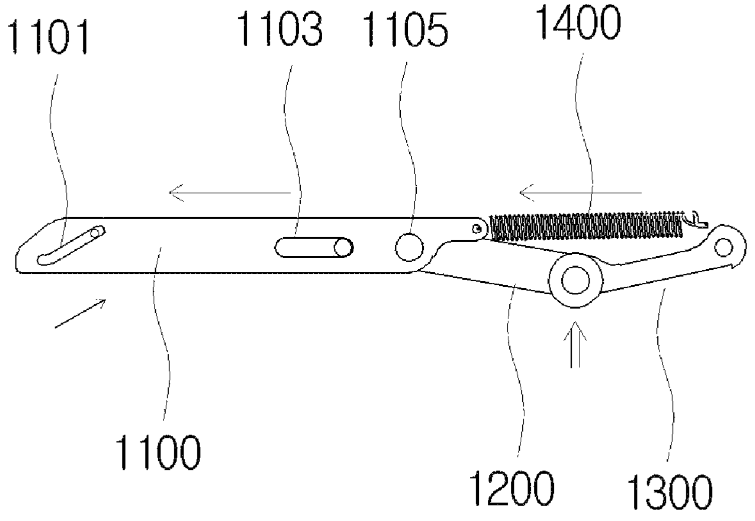
FIG. 5 is a front view illustrating an operation of FIG. 4.
Figure 6:
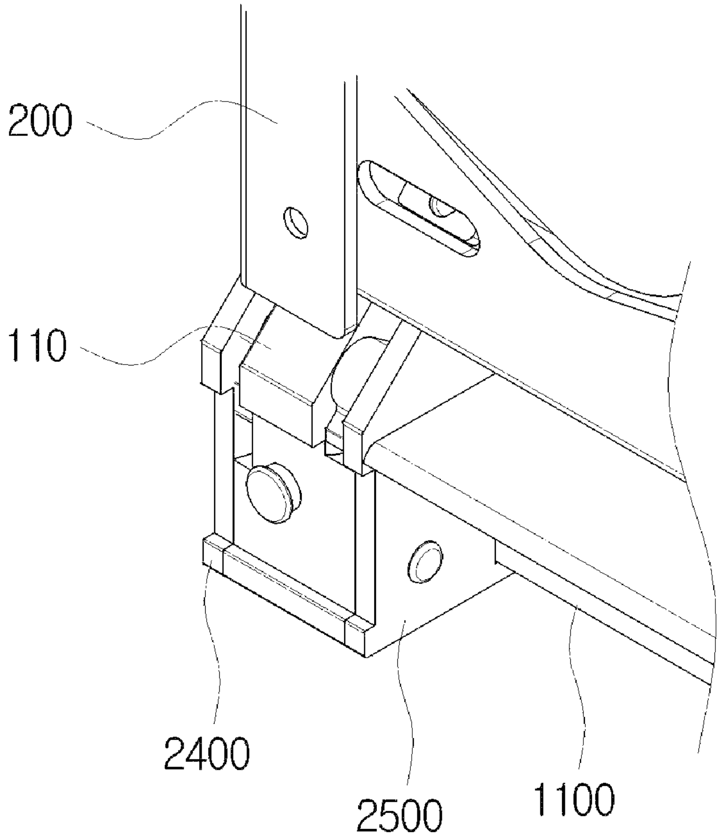
FIG. 6 is a perspective view illustrating a configuration of pressing end portions of an iron core according to the present invention.
Figure 7:
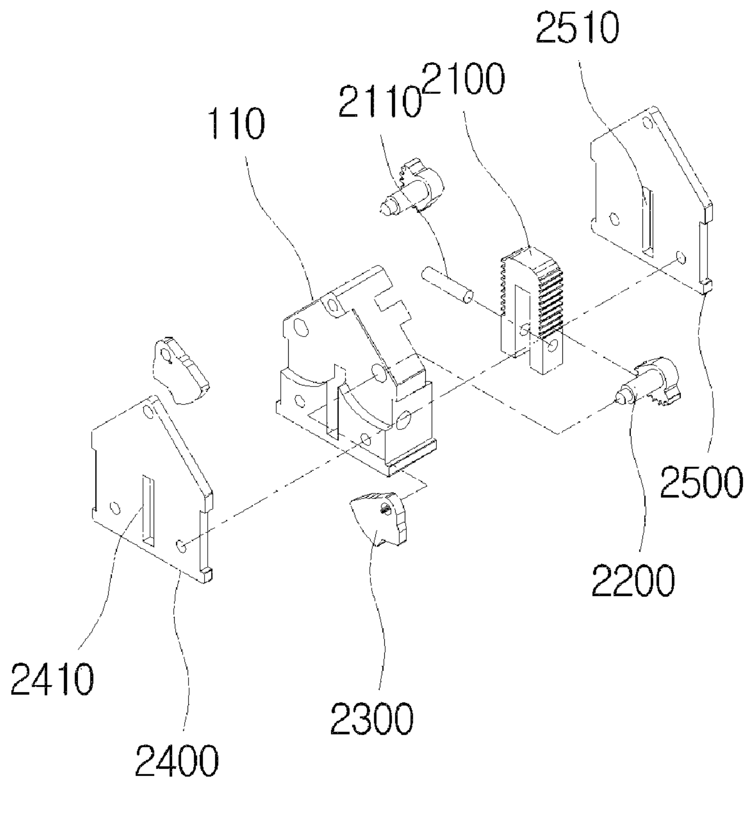
FIG. 7 is an exploded perspective view illustrating a disassembled state of the components of FIG. 6 viewed from the front.
Figure 8:
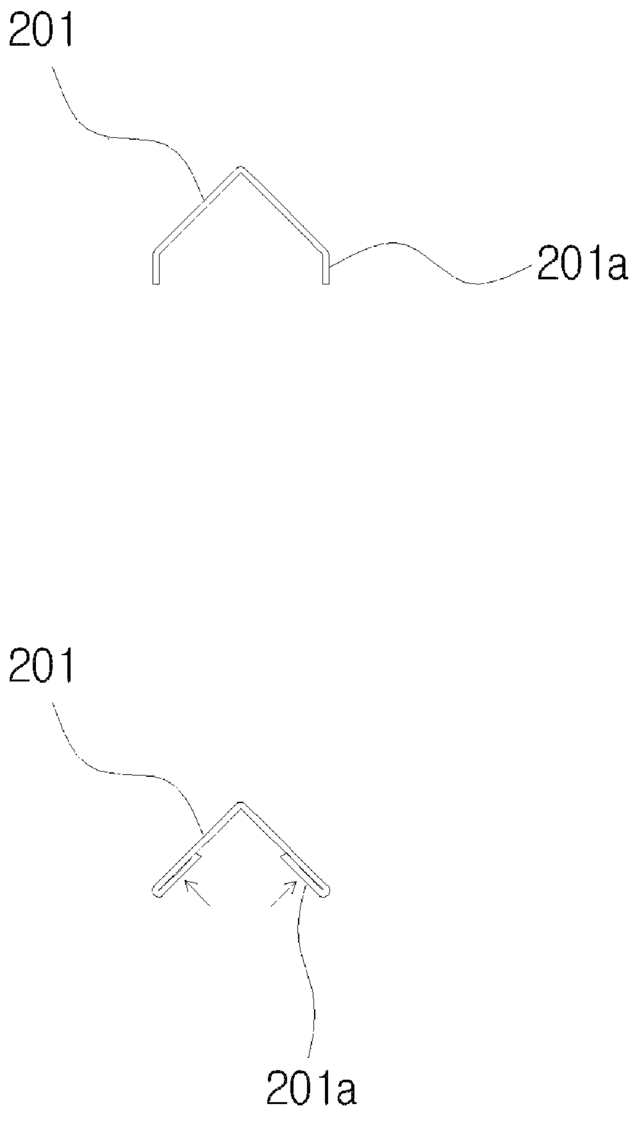
FIG. 8 is a front view showing an iron core to be used and an iron core after use according to the present invention.

Hereinafter, preferred configuration and operation of the present invention to achieve the object of the present invention will be described with reference to FIGS. 1 to 8.

First, the stapler which has been granted to the inventor of the present invention will be described.

The stapler includes: a lower plate 100 having an iron core support plate 110 formed at an end of one side of an upper portion thereof to make an iron core 201 of the stapler bent; an iron core storage part 200 of which an end portion is coupled with one side of the lower plate 100 by a hinge, into which a plurality of iron cores 201 are inserted in a horizontal direction, and which has an iron core outlet selectively discharging the iron core inserted into the iron core storage part, an iron core pushing member pushing the iron cores 201, a fixing rod which is formed on the opposite side of the iron core pushing member, and a first pushing elastic member of which one side is connected to the iron core pushing member and the other side is connected to the fixing rod; and an upper plate 300 of which one side is connected with the hinge, and which is disposed above the iron core storage part 200 and has a second pushing elastic member disposed therein to be connected with one side of the iron core storage part 200. The iron core support plate is formed to be gradually widened in the downward direction from the top, and has inclined surfaces formed at both sides of the upper portion and fitting portions extending downward from ends of the inclined surfaces. The outward appearance of a portion of the iron core storage part 200 in which the iron core outlet is formed corresponds to the shape of a portion of the upper part of the iron core support plate 110 so as to correspond to the portion of the upper part of the iron core support plate 110. Insertion spaces are respectively formed between the iron core support plate 110 and the iron core storage part 200 in different directions so that sides of a fabricated box can be put therein. After the sides of the box are respectively inserted into the insertion spaces, end portions facing each other come in perfect contact with each other. After that, a user drives iron cores 201 in each side so as to complete an edge of the box.

The lower plate 100 is a component that substantially refers to a lower part of the stapler, and has the iron core support plate 110 disposed at an end of the upper portion. The iron core support plate 110 has an iron core support plate 110 of a stapler is formed at an upper end of the lower plate 100. The iron core support plate 110 has the side formed in the shape of "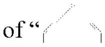". While one inner side surface and another inner side surface of the fabricated box come into close contact with the inclined surfaces, an edge of the box can be naturally and accurately formed by a vertex portion formed at the upper portion of the iron core support plat.

In other words, since the stapler is not to fix lots of paper like a general stapler but to fix edges of a box and does not need additional members such as conventional bolt-nuts in assembling, the stapler can provide convenience by easily fixing the edges of the box.

Meanwhile, the iron core support plate 110 may be integrally formed on the lower plate 100 or may be selectively fit to or separated from a stepped portion, which is formed at a portion of the lower plate 100 on which the iron core support plate 110 will be located, and to which the fitting portion of the iron core support plate 110 can be fit and caught.

Through the fitting and separation structure, if the iron core support plate 110 is damaged, only the iron core support plate 110 can be replaced so as to provide excellent maintenance and economic efficiency. In the fitting and separation structure, in order to provide stronger fixation power, both sides of the stepped portion are made longer than both sides of the iron core support plate 110 so that a forced fitting method can be applied. Alternatively, a key groove is formed at one side of the stepped portion and a key is formed at one side of the fitting portion of the iron core support plate 110 so as to be inserted into the key groove.

Moreover, a groove is formed in the iron core support plate 110 such that both ends of the iron core 201 of the stapler come into contact with each other to be bent in a direction facing each other.

The iron core storage part 200 has an insertion space into which the iron core 201 is inserted, and is hinge-coupled to the other side of the lower plate 100 where the iron core support plate 110 is formed, and includes a fixing rod, an iron core outlet, an iron core pushing member, and a first pushing elastic member.

The fixing rod is formed inside the iron core storage part 200 in a vertical direction so that one end portion of the first pushing elastic member can be caught and fixed, and is located on the other side of the iron core storage part 200 in which the iron core outlet is formed.

The iron core outlet 220 is formed on the other side of the iron core storage part 200 in which the fixing rod is formed, so that the iron core 201 can be discharged out by the upper plate 300.

In order to push the iron core 201 stored in the storage space in the direction of the iron core outlet, the first pushing elastic member has one side connected with the iron core pushing member and the other side connected with the fixing rod so as to push the iron core at any time by the property to push.

The iron core storage part 200 is similar to the structure of the conventional iron core storage part, the iron core 201 has a shape similar to the shape of the iron core support plate 110 to fix the box edges, and a lower portion of the storage space in which the iron cores 201 are stored has a shape corresponding to the shape of the iron core 201 to prevent separation of the iron cores so that the iron core 201 can be fixed.

Meanwhile, the upper plate 300 is hinge-coupled to a hinge-coupled portion of the iron core storage part 200, is positioned above the iron core storage part 200, and includes a second pushing elastic member, a support rod, and a locking bundle.

The upper plate 300 is provided to press the iron core 201 stored in the iron core storage part 200 to be stuck in the sides of the box so as to finally form edges of the box. The support rod of the upper plate 300 is formed to meet one side of the inclined surface which has a pulling elastic member formed around a fixing member of an operating means which will be described later, and the locking bundle is formed at the other side of the inner face of the upper plate 300 to be caught to an end of the pulling elastic member.

That is, the support rod is fixed to support the lower portion to prevent damage of the fixing member of the operating means, and the locking bundle is provided such that the pulling elastic member can be caught.

The operating means is an essential component, and includes a handle bar 410 allowing a user to directly pull with the hand, a fixing member, a moving pin, and a pulling elastic member.

The handle bar 410 has one side of an upper portion located inside the lower plate 100 and the upper plate 300 and the other side located below the lower plate 100. One side of the middle part of the handle bar 410 is hinge-coupled to one side of the lower portion of the lower plate 100 to rotate around the hinge. The handle bar 410 includes a retained groove formed at one side of the upper portion thereof to be selectively caught to the moving pin 430. When the user selectively pulls the handle bar, the retained groove surrounds the moving pin 430, the moving pin 430 is pushed in one direction along the upper side of the fixing member, so that the upper plate 300 is naturally pulled down and presses the upper portion of the iron core 201, thereby discharging the iron core and fixing the box edge.

As described above, the stapler for box edges is not a generally used stapler. The general stapler is inconvenient in use by pressing a portion located on the same line as the upper plate 300 and the iron core support plate 110 of the lower plate 100 on an edge portion of a box. Accordingly, the stapler for box edges includes the handle bar 410 which does not press the above portions but presses the upper portion of the other side of the upper plate 300 on which a handle and the iron core support plate 110 are formed, thereby providing convenience in working.

Also, although not shown, the handle bar 410 has a continuous waveform formed on the outer face of a lower portion thereof to allow the user to fit the fingers thereon to prevent slip. If necessary, the handle bar may further have a non-slip pad disposed on the outer surface thereof.

The fixing member is disposed inside the upper plate 300, and includes: a connection plate whose upper portion is connected with the inner upper portion of the upper plate 300 and which has a protrusion formed at one side of a lower portion so that the second pushing elastic member is fit thereon; and an inclined portion extending from an end of the connection plate and formed to be inclined downwards, and having a moving pin fixing plate having an end formed in the same direction as the connection plate. The connection plate is a component to be connected with the upper plate 300, and the inclined portion serves as a moving path allowing the moving pin 430 to move along the inclined portion. The other side which meets the moving pin 430 is supported by the support rod so as to prevent damage of the fixing member when the fixing member is pushed by pulling of the handle bar 410.

Furthermore, the moving pin fixing plate is arranged at the original state after the moving pin 430 moves along the inclined surface, and has a fixing groove having a rounded side to prevent separation of the moving pin. Therefore, the moving pin 430 is usually positioned in the fixing groove, and moves along the inclined portion when the handle bar is operated, and then, is positioned in the fixing groove again at the original state by the pulling elastic member which will be described later.

The moving pin 430 is positioned inside the upper plate 300 and is positioned in the fixing groove of the moving pin fixing plate. The moving pin is configured to selectively move along the inclined portion by the handle bar 410, and pushes the fixing member in one direction so that one side of the upper plate 300 is moved downward.

The pulling elastic member is a general spring having a property of pulling. One side of the pulling elastic member is connected with one side of the inner face of the upper plate 300 and the other side is connected with the moving pin 430 so as to restore the moving pin 430 into the original state when the user releases power applied to the handle bar 410 after the moving pin 430 moves along the inclined portion by the handle bar 410.

That is, the operating means forcibly moves the moving pin 430 when the handle bar 410 and one side of the upper plate 300 are pulled and pressed in the direction that they face each other, thereby discharging the iron core 201 of the stapler.

Meanwhile, a method for fixing box edges using the stapler includes a box shaping step, a box inserting step, an edge shaping step, and an edge fixing step.

The box shaping step is a step of forming an angle by folding the sides of a fabricated box. The box inserting step is a step of inserting the different sides of the fabricated box into an insertion space formed between the iron core support plate 110 of the lower plate 100 and the iron core storage part 200. In this instance, the inner surfaces of the sides of the box can be completely in contact with the iron core support plate 110.

The edge shaping step is a step of forming an edge by locating facing ends of the sides of the box to meet each other, and the ends of the box are completely in contact with each other.

The edge fixing step is a step of driving the iron cores 201 into the sides of the box to fix the edges of the box by pressing the lower plate 100 and the upper plate 300 n the facing direction or by pulling and pressing the handle bar 410 and the upper plate 300 in the facing direction. In the case of a polygonal box, the above-mentioned method is applied to each edge of the box, and is repeatedly performed to finally fix the edges of the box.

Hereinafter, the present invention relates to a stapler configured to allow a user to perform double-pulling of the handle bar 410 by pressing an end portion 201*a* of the iron core 201 in addition to the configuration of the stapler described above.

The stapler for box edges to press an end portion of an iron core by double pulling of a handle bar according to the present invention includes: a lower plate 100 having an iron core support plate formed at an end of one side of an upper portion thereof to make an iron core 201 of the stapler bent, the iron core support plate gradually getting wider downward from the top and having inclined surfaces respectively formed at both sides of the upper portion and fitting portions extending downward from ends of the inclined surfaces; an iron core storage part 200 of which an end portion is coupled with one side of the lower plate 100 by a hinge, into which a plurality of iron cores 201 are inserted in a horizontal direction, and which has an iron core outlet selectively discharging the iron core inserted into the iron core storage part, an iron core pushing member pushing the iron cores 201, a fixing rod which is formed on the opposite side of the iron core pushing member, and a first pushing elastic member of which one side is connected to the iron core pushing member and the other side is connected to the fixing rod; an upper plate 300 of which one side is connected with the hinge, and which is disposed above the iron core storage part 200 and has a second pushing elastic member disposed therein to be connected with one side of the iron core storage part 200; insertion spaces which are respectively formed between the iron core support plate and the iron core storage part 200 in different directions so that sides of a fabricated box can be put therein; and an operating means, of which one side of an upper portion is located inside the lower plate 100 and the upper plate 300 and the other side is located below the lower plate 100, and which has a handle bar 410, a fixing member, a moving pin 430, and a pulling elastic member so that a user can operate the stapler by pulling the handle bar.

The stapler according to the present invention further includes: a first load bar 1100 formed on the lower plate 100 and having a pushing groove 1101 formed at a predetermined angle, a sliding groove 1103 formed to be slidable in the back-and-forth direction, and a fixing groove 1105 to which a fixing pin is coupled; a second load bar 1200 connected with the fixing pin of the first load bar 1100; a third load bar 1300 of which one side is connected with the second load bar 1200 by a fixing pin and the other side is connected to the lower plate 100; a rack 2100 disposed inside the iron core support plate 110 and vertically sliding through a sliding pin connected to the sliding groove 1103 of the first load bar 1100; rotary gears 2200 respectively disposed at both sides and engaging and rotating with the rack 2100 sliding vertically; and pressing plates 2300 respectively disposed at both sides of the outer face of the iron core support plate 110 and connected with the rotary gears 2200 by fixing pins.

The stapler according to the present invention will be described in more detail.

Descriptions of the lower plate 100, the iron core storage part 200, the upper plate 300, the insertion space, and the operating means which are basic components of the present invention will be omitted.

The lower plate 100 includes the load bars and the pressing part. The load bars are the first, second and third load bars 1100, 1200 and 1300, and the pressing part includes the rack 2100, the rotary gears 2200, and the pressing plates 2300.

The first load bar 1100 has the pushing groove 1101 formed at a predetermined angle, the sliding groove 1103 formed to be slidable in the back-and-forth direction, and the fixing groove 1105 to which the fixing pin is coupled.

The pushing groove 1101 is formed in one side of the first load bar 1100 to penetrate the first load bar 1100 and has the predetermined angle. Moreover, the pushing groove has an extension groove extending to a predetermined length in a horizontal direction so that the first load bar 1100 can slide to the predetermined length in the horizontal direction.

The second load bar 1200 is connected with the first load bar 1100 by a fixing pin.

The second load bar 1200 has a second support member (not shown) supported by the first and third load bars 1100 and 1300 so that the first and third load bars 1100 and 1300 connected mutually do not exceed a predetermined angle.

One side of the third load bar 1300 is connected with the second load bar 1200 by a fixing pin and the other side is connected to the lower plate 100.

The other side of the third load bar 1300 has a third support member (not shown) supported by the lower plate 100 so that the third load bar 130 does not exceed a predetermined angle.

A pulling member 1400 is disposed at one side of the first load bar 1100 and is connected with the lower plate 100 so as to return the first load bar 1100 to its original position.

The pulling member 1400 is to return the first load bar 1100 sliding to the front surface of the stapler into its original position. The first load bar 1100 has a connection part at one side to be connected with one side of the pulling member 1400, and the lower plate 100 also has a connection part to be connected with the other side of the pulling member 1400.

The pulling member 1400 may be an element, such as a spring or a cylinder, to return the first load bar to its original position.

The pressing part includes the rack 2100, the rotary gears 2200, and the pressing plates 2300.

The rack 2100 is disposed inside the iron core support plate 110, and vertically slides through the sliding pin 2110 connected to the sliding groove 1103 of the first load bar 1100.

The rack 2100 has a through hole formed at the center so that the first load bar 1100 can pass through, and sliding pin holes formed at both sides such that the sliding pin 2110 connected to the sliding groove 1103 of the first load bar 1100 is connected.

Additionally, a plurality of saw-teeth are formed on the outer circumferences of both sides of the rack 2100.

The rotary gears 2200 which are formed at both sides engage with the rack 2100 sliding vertically to rotate with the rack 2100.

Each of the rotary gears 2200 has saw-teeth engaging with the saw-teeth of the rack 2100 and has an extension shaft extending in the horizontal direction.

The saw-teeth are formed such that the rotary gears 2200 are rotated according to the vertical sliding of the rack 2100, and the extension shaft is connected with the pressing plate 2300 after passing through the through hole of the iron core support plate 110.

The extension shaft has a fixed shaft protruding in one direction to prevent separation after being connected to the pressing plate.

The pressing plates 2300 are formed on the outer face of the iron core support plate 110, and are respectively formed at both sides to be connected with the rotary gears 2200 by fixing pins.

The pressing plates 2300 are rotated by the rotation of the rotary gears 2200, and press the end portion 201*a* of the iron core 201.

The rotary gear 2200 and the pressing plate 230 may be formed in a fan shape as illustrated, or may be formed in a shape which can press the end portion 201*a* of the iron core 201. That is, the rotary gear 2200 and the pressing plate 230 are not limited in their shape.

A rear support plate 2500 is disposed at one side of the rack 2100, and a front support plate 2400 is disposed at one side of the iron core support plate 110.

The front support plate 2400 has a through hole 2410 formed such that an end portion of the first load bar 1100 passes therethrough, and can support the pressing plate 2300 and prevent separation of the pressing plate.

The rear support plate 2500 has a through hole 2510 formed such that the end portion of the first load bar 1100 passes therethrough, and can support the rotary gear 2200 and prevent separation of the rotary gear.

The upper plate 300 has a guide path 350 through which the moving pin 430 moves.

The guide path 350 is to maximize effect when the user pulls the handle bar 410, and is configured to achieve the first pulling to locate the iron core at the edge of the box and the second pulling to press the end portion of the iron core.

The guide path 350 is formed in the a shape of ‘A’, but may be formed in a straight line or a bent line, and is not limited thereto in the shape.

According to the present invention, since the first, second and third load bars sliding on the front surface of the stapler, the rack sliding upward by the sliding of the first load bar, and the rotary gears rotating in engagement with the saw-teeth formed on the outer circumference by the sliding of the rack are rotated, the pressing plates disposed at portions spaced apart from the rotary gears at a predetermined interval press the end portions of the iron core, thereby minimizing protrusion of the end portions of the iron core when the iron core is stuck on a box, preventing contents in the box from being caught to the end portions of the iron core, and maximizing an aesthetic sense.

The invention claimed is:

1. A stapler for box edges to press an end portion of an iron core by double pulling of a handle bar which includes: a lower plate 100 having an iron core support plate formed at an end of one side of an upper portion thereof to make an iron core 201 of the stapler bent, the iron core support plate gradually getting wider downward from the top and having inclined surfaces respectively formed at both sides of the upper portion and fitting portions extending downward from ends of the inclined surfaces; an iron core storage part 200 of which an end portion is coupled with one side of the lower plate 100 by a hinge, into which a plurality of iron cores 201 are inserted in a horizontal direction, and which has an iron core outlet selectively discharging the iron core inserted into the iron core storage part, an iron core pushing member pushing the iron cores 201, a fixing rod which is formed on the opposite side of the iron core pushing member, and a first pushing elastic member of which one side is connected to the iron core pushing member and the other side is connected to the fixing rod; an upper plate 300 of which one side is connected with the hinge, and which is disposed above the iron core storage part 200 and has a second pushing elastic member disposed therein to be connected with one side of the iron core storage part 200; insertion spaces which are respectively formed between the iron core support plate and the iron core storage part 200 in different directions so that sides of a fabricated box can be put therein; and an operating means, of which one side of an upper portion is located inside the lower plate 100 and the upper plate 300 and the other side is located below the lower plate 100, and which has a handle bar 410, a fixing member, a moving pin 430, and a pulling elastic member so that a user can operate the stapler by pulling the handle bar, the stapler comprising:

- a first load bar 1100 formed on the lower plate 100 and having a pushing groove 1101 formed at a predetermined angle, a sliding groove 1103 formed to be slidable in the back-and-forth direction, and a fixing groove 1105 to which a fixing pin is coupled;
- a second load bar 1200 connected with the fixing pin of the first load bar 1100;
- a third load bar 1300 of which one side is connected with the second load bar 1200 by a fixing pin and the other side is connected to the lower plate 100;
- a rack 2100 disposed inside the iron core support plate 110 and vertically sliding through a sliding pin connected to the sliding groove 1103 of the first load bar 1100;
- rotary gears 2200 respectively disposed at both sides and engaging and rotating with the rack 2100 sliding vertically; and
- pressing plates 2300 respectively disposed at both sides of the outer face of the iron core support plate 110 and connected with the rotary gears 2200 by fixing pins.

2. The stapler according to claim 1, wherein a front support plate (2400) is disposed on one side of the iron core support plate (110) and has a through hole (2410) formed such that an end portion of the first load bar (1100) passes therethrough.

3. The stapler according to claim 1, wherein a rear support plate (2500) is disposed on one side of the rack (2100) and has a through hole (2510) formed such that an end portion of the first load bar (1100) passes therethrough.

4. The stapler according to claim 1, wherein a pulling member (1400) is disposed at one side of the first load bar (1100) and is connected with the lower plate (100) so as to return the first load bar (1100) to its original position.

5. The stapler according to claim 1, wherein the upper plate (300) has a guide path 350 through which the moving pin (430) moves.

* * * * *